(12) United States Patent
Long et al.

(10) Patent No.: US 9,152,282 B2
(45) Date of Patent: Oct. 6, 2015

(54) METHOD AND SYSTEM FOR ENABLING TOUCH CONTROLLER TO BE ADAPTIVE TO CAPACITIVE TOUCH SENSOR

(71) Applicant: SHENZHEN HUIDING TECHNOLOGY CO., LTD., Shenzhen, Guangdong (CN)

(72) Inventors: Hua Long, Guangdong (CN); Xinghuo Zhu, Guangdong (CN)

(73) Assignee: SHENZHEN HUIDING TECHNOLOGY CO., LTD., Shenzhen (CN)

(*) Notice: Subject to any disclaimer, the term of this patent is extended or adjusted under 35 U.S.C. 154(b) by 193 days.

(21) Appl. No.: 13/886,277

(22) Filed: May 3, 2013

(65) Prior Publication Data
US 2013/0241874 A1 Sep. 19, 2013

Related U.S. Application Data

(63) Continuation of application No. PCT/CN2012/079791, filed on Aug. 7, 2012.

(30) Foreign Application Priority Data

Sep. 19, 2011 (CN) .......................... 2011 1 0278456

(51) Int. Cl.
G06F 3/044 (2006.01)
G06F 3/041 (2006.01)
(52) U.S. Cl.
CPC .............. G06F 3/044 (2013.01); G06F 3/0418 (2013.01)

(58) Field of Classification Search
CPC ................................. G06F 3/041; G06F 3/044
USPC ..................................................... 345/173–178
See application file for complete search history.

(56) References Cited

U.S. PATENT DOCUMENTS

2012/0044188 A1* 2/2012 Prendergast et al. ......... 345/174
2013/0231656 A1* 9/2013 Dunning ......................... 606/34

FOREIGN PATENT DOCUMENTS

CN 101281439 10/2008
CN 102298477 12/2011

OTHER PUBLICATIONS

International Search Report issued by the State Intellectual Property Office of China for the PCT application No. PCT/CN2012/079791.

* cited by examiner

Primary Examiner — Gerald Johnson
Assistant Examiner — Christopher Kohlman

(57) ABSTRACT

A method and a system for enabling a touch controller to be adaptive to a capacitive touch sensor are disclosed. The method may include: step A in which the touch controller detects and samples all the capacitors in the sensor model identification circuit and parses the sampled data; and step B in which the touch sensor selects parameters corresponding to a sensor model in accordance with a parsing result of step A to perform touch detection processing to the capacitive touch sensor. The disclosed methods and systems which are easy to implement and have lower cost can be applied in various digital products with capacitive touch screens, which not only facilitates replacing touch panel modules with different models or supplied by different suppliers, but also can ensure ideal touch detection results.

11 Claims, 5 Drawing Sheets

| Capacitors | C1 | C2 | C3 | C4 | C5 | C6 |
|---|---|---|---|---|---|---|
| Sampled Values | 800 | 562 | 084 | 431 | 256 | 672 |
| Code Values | 3 | 2 | 0 | 1 | 0 | 2 |

METHOD AND SYSTEM FOR ENABLING TOUCH CONTROLLER TO BE ADAPTIVE TO CAPACITIVE TOUCH SENSOR

CROSS-REFERENCE TO RELATED APPLICATIONS

The present application is a Continuation Application of PCT application No. PCT/CN2012/079791 filed on Aug. 7, 2012, which claims the benefit of Chinese Patent Application No. 201110278456.0 filed on Sep. 19, 2011; the contents of which are hereby incorporated by reference.

FIELD

The present invention relates to touch screen technology and, more particularly, to a method and a system for enabling a touch controller to be adaptive to a capacitive touch sensor.

BACKGROUND

Capacitive touch screens have been widely used in mobile handheld electronic devices. The capacitive touch screen includes a display screen with a transparent capacitive touch panel disposed thereon. In current product design and fabrication, almost all capacitive touch screens adopt the similar circuits and structures. As shown in FIG. 1, from the perspective of circuit logic principle, the touch panel is usually a module integrating a capacitive touch sensor and a touch controller. The touch controller detects touches on the capacitive touch sensor, and transmits a detection result to a host circuit board. As shown in FIG. 2, from the perspective of structure, the touch panel is connected to the host circuit board of the electronic device through a flexible printed circuit (FPC) board, and the touch controller is installed on the FPC board. According to the capacitive touch detection principle, to obtain satisfied detection results, various characteristic parameters of the capacitive touch sensor that is used in combination with the touch controller need to be preset in the touch controller prior to the touch detection. Considering the characteristics of the capacitive touch detection technology, in this type of application, the touch controller and the capacitive touch sensor that is used have a one-to-one correspondence relationship. That is, each specific capacitive touch sensor needs to be used in combination with one specific touch controller model and corresponding firmware.

However, during mass production, for the purposes of simplifying the fabrication process and controlling the procurement cost, the manufacturers often wish to install the touch controller on the host circuit board, and wish that the same touch product can use touch sensor modules without a touch controller that are of different models or are supplied by different suppliers. What is needed, therefore, is to enable the touch controller installed on the host circuit board to identify the touch sensors of different models or supplied from different suppliers, such that the touch controller is able to automatically use preset parameters corresponding to the specific touch sensor to thereby obtain ideal touch detection results. FIG. 3 illustrates a conventional method for addressing this issue. In FIG. 3, part of IO ports in the layout of the touch controller are defined as model selection input pins P1, P2, ..., P6, and are connected to different combinations of high and low voltage through a simple switch circuit K1, K2, ..., K6. This way, the touch controller is enabled to select corresponding touch sensor model according to the input status of these selection input pins. However, this method has the disadvantages that it needs to occupy the IO ports of the touch controller and multiple pins on the FPC need also to be occupied. The IO ports of the touch controller are often scarce resources and increasing the number of the FPC pins also increases the cost of connectors. This may be why this method has never been widely put into practice. What is needed, therefore, is a better method for addressing this issue.

SUMMARY

Accordingly, the present invention is directed to a method and a system for enabling a touch controller to be adaptive to a capacitive touch sensor, such that a single touch controller can be commonly used with different capacitive touch sensor models.

In one aspect, a method enabling a touch controller to be adaptive to a capacitive touch sensor is introduced. The capacitive touch sensor is connected to a capacitor-based sensor model identification circuit. The method may include: step A in which the touch controller detects and samples all the capacitors in the sensor model identification circuit and parses the sampled data; and step B in which the touch sensor selects parameters corresponding to a sensor model in accordance with a parsing result of step A to perform touch detection processing to the capacitive touch sensor.

In one embodiment, parsing the sampled data at step A may further include: step A1 in which the touch controller identifies a largest value from relative capacitance data obtained by sampling and format-converts the largest value according to a preset number of grades; step A2 in which remaining relative capacitance data other than the largest value are format-converted according to the preset number of the grades and the difference between the remaining relative capacitance data and the largest value; and step A3 in which a model of the current capacitive touch sensor is obtained according to code values resulted from format-converting all the relative capacitance data and the correspondence between preset code values and sensor models.

In one embodiment, the preset number of the grades may be an integer less than sixteen.

In one embodiment, the preset number of the grades may be 2, 4, 8, or 16.

In another aspect, a system enabling a touch controller to be adaptive to a capacitive touch sensor is introduced. The system may include a host circuit board, a touch controller, a capacitive touch sensor, and a sensor model identification circuit connected to the capacitive touch sensor. The touch controller is disposed on the host circuit board, and the touch controller is configured to sample the sensor model identification circuit, parse the sampled data, and select parameters corresponding to a parsing result to perform touch detection processing to the capacitive touch sensor.

In one embodiment, the sensor model identification circuit comprises a plurality of capacitor units. The touch controller first identifies a largest value from sampled relative capacitance data and format-converts the largest value into a maximum code value according to a preset number of grades; the touch controller then format-converts remaining relative capacitance data other than the largest value into corresponding code values according to the preset number of the grates and the difference between the remaining relative capacitance data and the largest value; finally, a model of the current capacitive touch sensor is obtained according to a set of code values obtained as a parsing result by format-conversion of all the relative capacitance data and a correspondence between prestored parsing results and sensor models.

In one embodiment, the sensor model identification circuit includes a plurality of capacitors with fixed capacitance.

In one embodiment, the sensor model identification circuit is disposed on the capacitive touch sensor and comprises a driving line and a sensing line, and the driving line multiplexes driving electrodes of the capacitive touch sensor or the sensing line multiplexes sensing electrodes of the capacitive touch sensor.

In still another aspect, a touch screen terminal comprising a display apparatus and a system enabling a touch controller to be adaptive to a capacitive touch sensor as described above is introduced.

This disclosure proposes to use a sensor model identification circuit to address the identification issues in identifying the capacitive touch sensor models and provides detailed identification circuit structures and methods for obtaining model codes through conversion. The disclosed methods and systems which are easy to implement and have lower cost can be applied in various digital products with capacitive touch screens, which not only facilitates replacing touch panel modules with different models or supplied by different suppliers, but also can ensure ideal touch detection results.

Other independent aspects of the invention will become apparent by consideration of the detailed description, claims and accompanying drawings.

DESCRIPTION OF THE EMBODIMENTS

Before any independent embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

In various embodiments of the invention, a capacitor-based sensor model identification circuit is disposed in a touch sensor module, such that a touch controller can read out code information contained in capacitors of the sensor model identification circuit by detecting the sensor model identification circuit. That is, the touch controller can identify the model of a connected touch panel module, thereby achieving optimized touch detection results by using detection parameters corresponding to the identified model.

Figure 1:
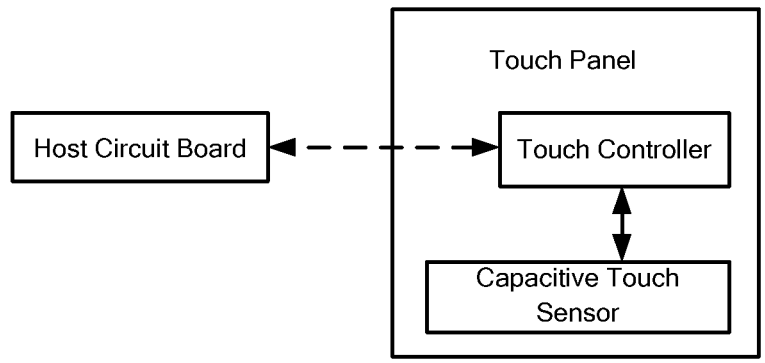
FIG. 1 is a block diagram of a circuit of a conventional touch panel.
Figure 2:
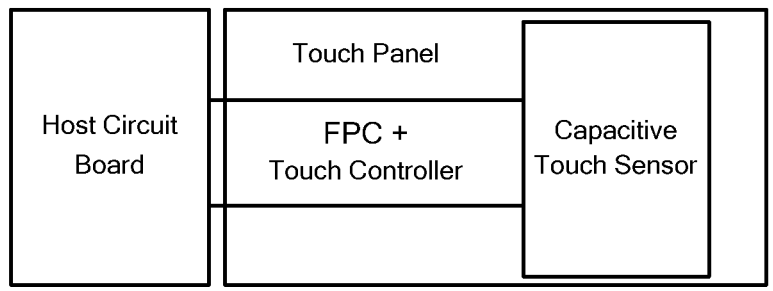
FIG. 2 is a block diagram of a structure of the conventional touch panel.
Figure 3:
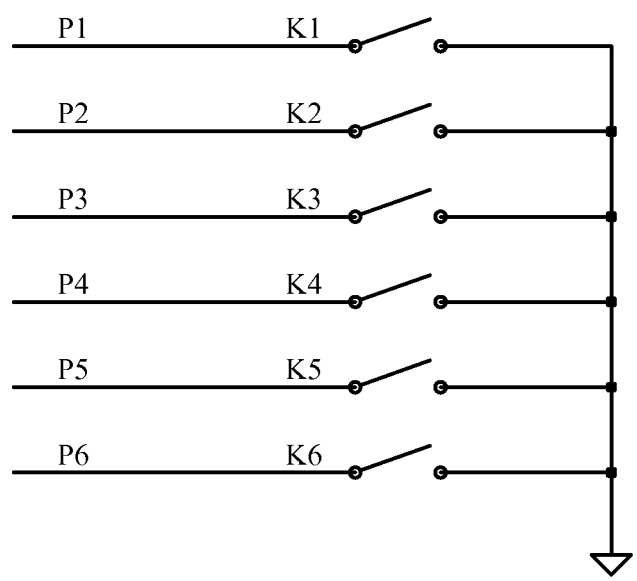
FIG. 3 is a circuit diagram showing conventional sensor model identification using IO ports by means of external switches.
Figure 4:
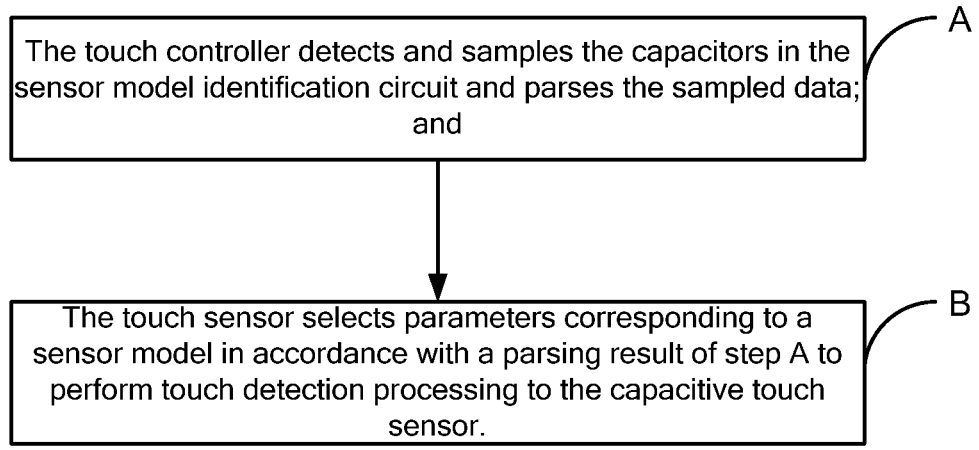
FIG. 4 is a flow chart of a method enabling a touch controller to be adaptive to a capacitor touch sensor according to one exemplary embodiment.

FIG. 4 is a flow chart of a method enabling a touch controller to be adaptive to a capacitor touch sensor according to one exemplary embodiment.

Referring to FIG. 4, at step A, the touch controller detects and samples all the capacitors in the sensor model identification circuit and parses the sampled data.

Figure 5:
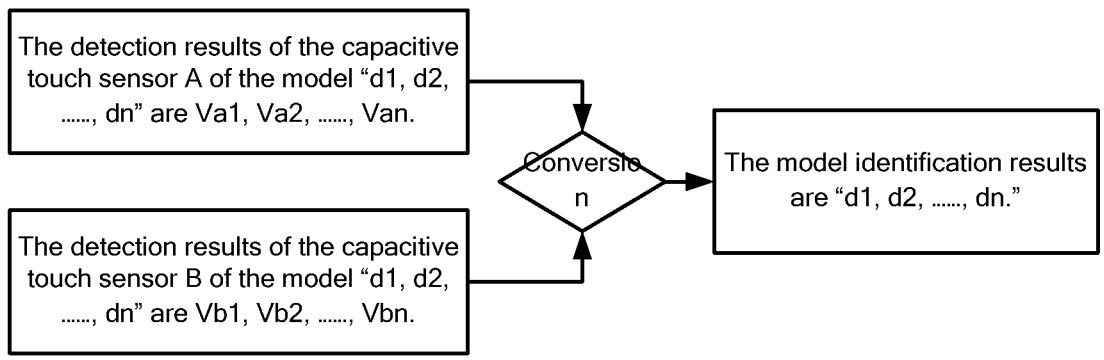
FIG. 5 is a view illustrating the principle of obtaining the same parsing result from different sampled results of the same sensor model.

In this embodiment, the capacitive touch sensor is connected to the sensor model identification circuit which is capacitor-based. Specifically, capacitor devices of the sensor model identification circuit may be standard capacitors with fixed capacitance, projected capacitance formed by layout of driving lines and sensing lines of the touch sensor, or self-capacitance relative to a reference ground that is formed by layout of the sensing lines of the touch sensor. What is obtained at step A is a group of relative capacitance data in proportion to capacitance of corresponding capacitors. For example, for a group of capacitors $Ci1, Ci2, \ldots, Cin$ in the sensor model identification circuit, capacitance-to-digital conversion (CDC) results obtained by sampling the capacitors are $Vi1, Vi2, \ldots, Vin$, i.e. a group of relative capacitance data (instead of the capacitors' absolute capacitance) indicative of the capacitors' capacitance. While the relative capacitance data obtained by the initial conversion contain the information about the sensor model, the capacitance of the capacitors $Ci1, Ci2, \ldots, Cin$ of the sensors of the same model may not be exactly the same and the relative capacitance data sampled on the capacitors cannot be always fixed values because of the discreteness of circuit fabrication of the actual products and errors in the detection results. Considering the above factors, for simplicity of record and identification, the relative value of each relative capacitor data is further format-converted to obtain a code result indicative of the model. That is, it may be necessary to do a certain format adjustment to the relative values of the obtained capacitance values, such that the same module model number "$d1, d2, \ldots, dn$" can be derived from the detection results of the capacitors $Ci1, Ci2, \ldots, Cin$ of the module of the same model. As shown in FIG. 5, although Va1 is not equal to Vb1, Va2 is not equal to Vb2, Van is not equal to Vbn, after converted, they correspond to the same group of results: $d1, d2 \ldots dn$.

According to the method described above, in practice, the capacitors $Ci1, Ci2 \ldots Cin$ of the sensor model identification circuit may each be configured to have a capacitance that is easily distinguishable. Here, the standard of being easily distinguishable depends on the discreteness of capacitor fabrication and the accuracy of capacitor detection. Grading is usually used to judge such distinguishability. For example, if there are ten grades, it indicates the capacitors $Ci1, Ci2, \ldots, Cin$ may be configured to have ten difference capacitance values that are distinguishable even the discreteness of the capacitor fabrication and the errors in the detection process are taken into account. If there are two grades, the capacitors $Ci1, Ci2, \ldots, Cin$ are only required to have two different capacitance values. As can be seen, the less the number of the grades is, the lower requirements it imposes on the discreteness of the capacitor fabrication and the accuracy of the detection system. On the other hand, the more the number of the grades is, the less capacitors the identification circuit can use to represent a large number of module model codes. For example, if there are two grades, it indicates that a total of eight capacitors are needed for 256 models; if there are sixteen grades, it indicates that only two capacitors are needed for 256 models. The use of less capacitors translates into simplified design and cost reduction. Therefore, under the premise that the identification results are stable and reliable, a higher number of grades should be adopted in the design of the identification circuit.

Based on the above considerations, parsing the sampled data at step A may further include the following steps.

At step A1, the touch controller identifies a largest value from the relative capacitance data obtained by sampling and format-converts the largest value into a largest code value determined by a preset number of the grades.

At step A2, the remaining relative capacitance data other than the largest value are format-converted into corresponding code values according to the preset number grates and the difference between the remaining relative capacitance data and the largest one.

At step A3, the model of the current capacitive touch sensor is obtained according to the code values resulted from format-converting all the relative capacitance data and the correspondence between preset code values and sensor models.

The preset number of the grades is k, which is an integer determined according to a preset manner of the format-conversion and which should be adapted to design specifications of the sensor model identification circuit and should be able to achieve a sufficient precision so as to ensure an accurate identification result. Capacitances are analog values and are discrete. In order to ensure determinacy of the conversion results, in configuring the capacitance of the capacitors of the sensor model identification circuit, an allowable maximum error range R that can avoid confusion needs to be determined. The capacitance of one of the capacitors (e.g. Cn) is set to be Mk which is the largest one and which has a defined code value (k−1). Other capacitors are all converted to obtain their respective code values based on the capacitance data of this capacitor. For simplifying the calculating process, R is usually set as a difference between values of two adjacent grades ○ As such, the value range corresponding to each code can be determined, which is used as a basis for format-conversion.

Figure 6:
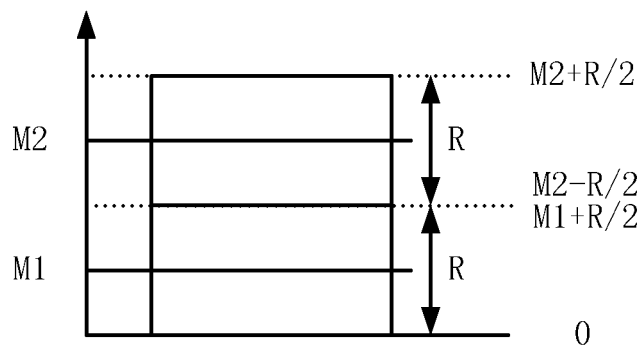
FIG. 6 is a schematic view illustrating the value conversion method when the number of the grades is two.

For example, in one embodiment illustrated in FIG. 6, there are preset two grades. The largest one of the sampled relative capacitance data is M2 and, therefore, R=2M2/3, and M1=R/2=M2/3. As such, if a capacitance data falls within the range of (M1±R/2), then the code value corresponding to this capacitance data is 0; if a capacitance data falls within the range of (M2±R/2), then the code value corresponding to this capacitance data is 1.

Figure 7:
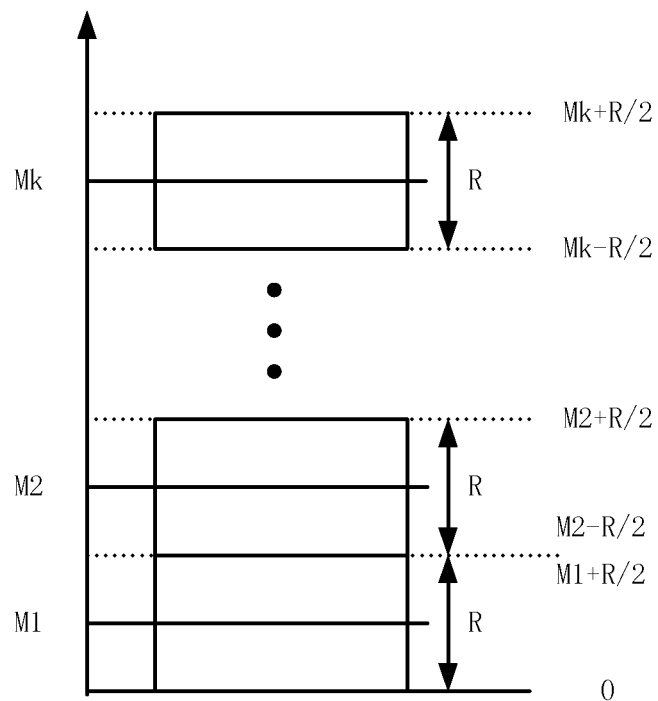
FIG. 7 is a schematic view illustrating the value conversion method when the number of the grades is k.

In another embodiment illustrated in FIG. 7, the number of the grades is set as k. In this embodiment, the largest one of the sampled relative capacitance data is Mk and, therefore, R=2Mk/(2k−1), M1=R/2, M2=3R/2, . . . . As such, the value range of each grade interval can be determined, and the relative capacitance data falling within each value range can be format-converted to obtain its respective code value.

It is noted that, in the above embodiments, there is an overlapping value between adjacent grade intervals. For example, M1+R/2=M2−R/2, etc. If a sampled capacitance data exactly falls on this value, it leads to a reliable result. In order to avoid this problem, the number of the grades k needs to be properly selected such that the actual sampled data are all distributed close to a central portion of each grade interval.

It can thus be seen that choosing a large number of the grades requires high precision component parameters and high detection precision.

In the above embodiments, the conversion results are actually K-based numbers. Theoretically, k may be any integer greater than 1. Considering factors such as the convenience of controller processing and the precision of actual circuit, the number of the grades is selected to be less or equal to 16. In particular, processing may be most convenient and fastest when k=2, 4, 8, or 16. For example, in one embodiment, the number of the grades k is equal to 4, and six capacitors are used. In this case, considering one of the six capacitors has a fixed largest capacitance, the total number of the sensor models that can be represented is: $4*4*4*4=4^5=1024$.

Figures 12, 13:
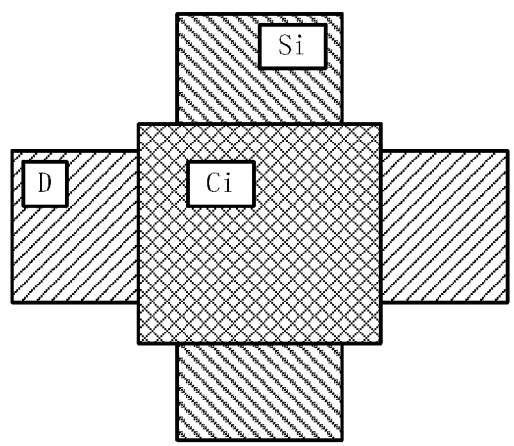
FIG. 12 is a view illustrating that circuitry of the sensor model identification circuit is arranged in two opposite layers according to one exemplary embodiment.
FIG. 13 is a table showing format-conversion according to one exemplary embodiment.

A specific format-conversion example is discussed below with reference to FIG. 13. FIG. 13 lists sampled results of model identification circuits of two sensor modules, i.e. the sampled values (in decimal) on capacitors C1 to C6, with C1 being 800 which is the largest one. Assuming there are four grades, then numbers that the code values use are 0, 1, 2, and 3. According to the above steps and rules, the ranges of the sampled values corresponding to their respective code values may be determined as follows:

0: (0-300)
1: (301-500)
2: (501-700)
3: (701-900)

Based on the above ranges, the format-conversion result of this group of sampled data is the code "320202". As can be seen easily, even if the sampled data vary greatly, the conversion result can still remain the same.

In the embodiment of FIG. 13, the capacitance codes set for C3 and C5 are 0. Therefore, the capacitors C3 and C5 need not to be formed in the layout of the model identification circuit. Rather, they can be hypothetical capacitors.

As a simplest implementation, the number of the grades may be set as 2, each model only uses one capacitor which represents the code "1", and the capacitor with a code "0" needs not to be disposed in the layout. This can greatly simplify the design of the model identification circuit and the conversion processing to the sampled data, and also can be easily implemented in various current capacitive touch sensor module products.

At step B, the touch sensor selects parameters corresponding to a sensor model in accordance with the parsing result of step A to perform touch detection processing to the capacitive touch sensor.

Capacitive touch sensors of different models are often different in material, layout, structure as well as fabrication. Therefore, the touch controller is required to have the corresponding parameters to obtain proper touch detection results and satisfactory technical index such as sensitivity, linearity and resolution.

Figure 8:
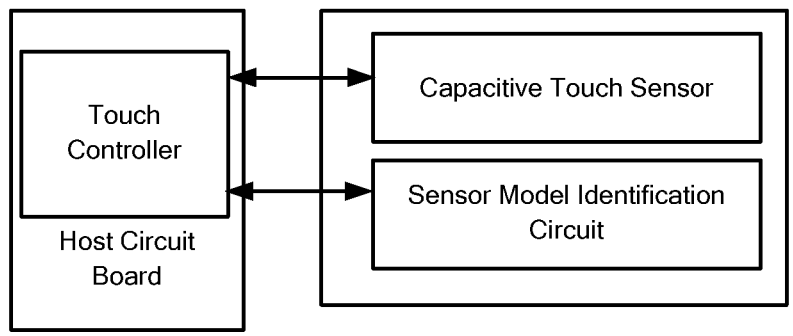
FIG. 8 is a block diagram of a circuit of a touch panel according to one exemplary embodiment.
Figure 9:
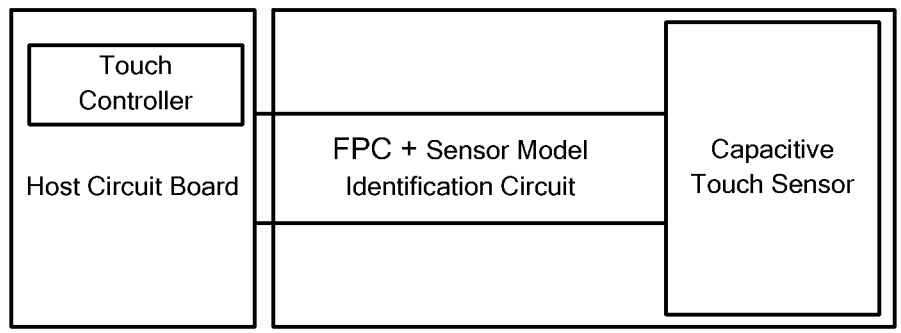
FIG. 9 is a block diagram of a structure of the touch panel.

People skilled in the art can appreciate that part or all of the steps of the method of the above embodiments can be implemented by hardware under the instruction of program. The program may be stored on a computer readable medium such as ROM/RAM, magnetic disk, optical disc or the like FIG. 8 and FIG. 9 are schematic views illustrating systems enabling a touch controller to be adaptive to a capacitive touch sensor according to exemplary embodiments. For simplicity, only parts that are relevant to these embodiments are shown.

The system illustrated in FIG. 8 and FIG. 9 includes a host circuit board, a touch controller, a capacitive touch sensor (briefly referred to as sensor), and a sensor model identification circuit. The touch controller is disposed on the host circuit board. The touch controller is used to sample the sensor model identification circuit disposed at one side of the sensor, parse the sampled data, and select parameters corresponding to the parsing results to perform touch detection processing to the capacitive touch sensors. The difference between the embodiments of FIG. 8 and FIG. 9 lies in that, the model identification circuit of FIG. 8 is disposed within the layout area of the touch sensor, while the model identification circuit of FIG. 9 is disposed on a flexible printed circuit (FPC) board connecting the sensor and the host circuit board. The FPC is fixedly connected to the sensor, and is connected to the host circuit board via a disengageable socket connection. As such, the sensor model identification circuit is always kept integral to the sensor.

Figure 10A:
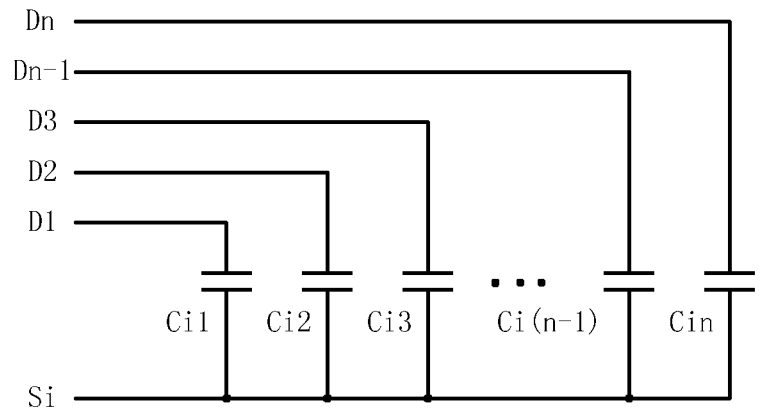
FIG. 10A and FIG. 10B are views illustrating the structure of the sensor model identification circuit according to one exemplary embodiment.
Figure 10B:
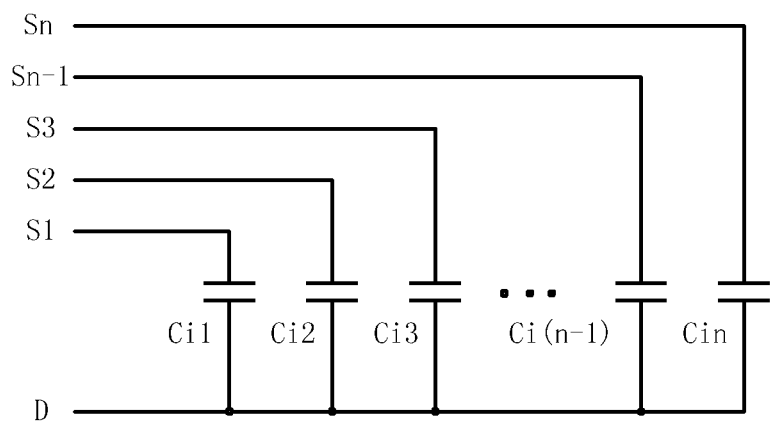

Specifically, the sensor model identification circuit includes a plurality of capacitor units. As shown in FIG. 10A, in one embodiment, D1, D2, . . . , Dn are connected to respective driving signal pins of the touch controller, and Si is connected to a dedicated detection input pin of the touch controller. In another embodiment illustrated in FIG. 10B, S1, S2, . . . , Sn are connected to respective sensing detection pins of the touch controller, and D is connected to a dedicated driving signal pin of the touch controller. The touch controller detects relative capacitance of each capacitor (Ci1, Ci2, . . . , Cin) of the sensor model identification circuit. By format-converting the sampled relative capacitance, the touch controller can read the model code of the sensor. In another embodiment illustrated in FIG. 10B, D is connected to a common ground, such that the touch sensor can be adaptive to a sensor based on self-capacitance detection principle.

The touch controller first identifies a largest value from the sampled relative capacitance data and then format-converts the largest value into a maximum code value according to the preset number of the grades (the maximum code value is 1 if the number of the grades is 2; the maximum code value is 2 if the number of the grades is 3, . . . , the maximum code value for other number of the grades may be deduced by analogy). The touch controller then format-converts the remaining relative capacitance data other than the largest one into corresponding code values according to the preset number of the grates and the difference between the remaining relative capacitance data and the largest value. Finally, a model of the current capacitive touch sensor is obtained according to a set of code values obtained as a parsing result by format-conversion of all the relative capacitance data and a correspondence between prestored parsing results and sensor models. As described above, the preset number of the grades may be an integer less than sixteen, e.g. 2, 4, 8, 16.

The sensor model identification circuit includes a plurality of capacitors with fixed capacitance. Considering constraints of the actual sensor products in size and material, chip capacitors may be used. However, as an alternative solution with lower cost, in practice, the capacitors may also be obtained through layout. That is, the distributed capacitance may be obtained by properly setting the spatial relationship, more accurately, coupling relationship, between the driving lines and sensing lines or between the sensing lines and the common ground.

Figure 11:
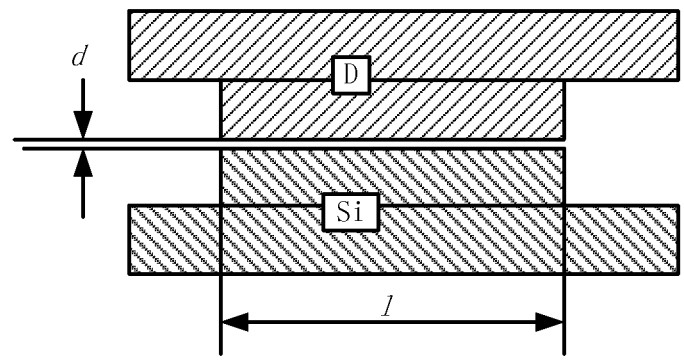
FIG. 11 is a view illustrating that circuitry of the sensor model identification circuit is arranged in the same layer according to one exemplary embodiment.

FIG. 11 illustrates a partial structure of an exemplary sensor model identification circuit in which capacitance is obtained through layout in the same layer. In this structure, the driving line D and sensing line Si are arranged in parallel with each other with a small distance formed therebetween, and the desired distributed capacitance is obtained by adjusting adjacent side length l and the distance d.

FIG. 12 illustrates a partial structure of an exemplary sensor model identification circuit in which capacitance is obtained through layout in two opposite layers. In this structure, the driving line D and sensing line Si are arranged so as to form overlapping parallel planes, and the desired distributed capacitance is obtained by adjusting the gap and overlapping area between the two overlapping parallel planes. It is also to be noted that obtaining of the desired distributed capacitance also depends on factors such as the material of the substrate on which the lines are formed, fabrication precision, and install locations.

In the above embodiments, all sensing electrodes and driving electrodes are connected to their respective pins of the touch controller. It should be understood that the number of the pins of the touch controller may be reduced by multiplexing the driving electrodes or the sensing electrodes.

Although the touch controller is illustrated as being disposed on a host circuit in FIG. 8, FIG. 9 and the above description, it is noted that the touch controller may also be formed on the FPC together with the sensor model identification circuit in alternative embodiments.

The system enabling the touch controller to be adaptive to the capacitive touch sensor is applicable in any capacitive touch screen terminal.

It will be apparent to those skilled in the art that various modifications and variations can be made to the disclosed structure without departing from the scope or spirit of the invention. In view of the foregoing, it is intended that the present invention cover modifications and variations of this invention provided they fall within the scope of the following claims and their equivalents.

What is claimed is:

1. A method for enabling a touch controller to be adaptive to a capacitive touch sensor, the capacitive touch sensor connected to a capacitor-based sensor model identification circuit, the method comprising:
    step A in which the touch controller detects and samples all the capacitors in the sensor model identification circuit and parses the sampled data; and
    step B in which the touch sensor selects parameters corresponding to a sensor model in accordance with a parsing result of step A to perform touch detection processing to the capacitive touch sensor,
    wherein step A comprises:
    step A1 in which the touch controller identifies a largest value from relative capacitance data obtained by sampling and format-converts the largest value according to a preset number of grades;
    step A2 in which remaining relative capacitance data other than the largest value are format-converted according to the preset number of the grades and a difference between the remaining relative capacitance data and the largest value; and
    step A3 in which a model of the current capacitive touch sensor is obtained according to code values resulted from format-converting all the relative capacitance data and correspondence between preset code values and sensor models.

2. The method according to claim 1, wherein the preset number of the grades is an integer less than sixteen.

3. The method according to claim 2, wherein the preset number of the grades is 2, 4, 8, or 16.

4. A system for enabling a touch controller to be adaptive to a capacitive touch sensor, comprising a host circuit board, a touch controller, a capacitive touch sensor, and a sensor model identification circuit connected to the capacitive touch sensor, wherein the touch controller is disposed on the host circuit board, and the touch controller is configured to sample the sensor model identification circuit, parse the sampled data, and select parameters corresponding to a parsing result to perform touch detection processing to the capacitive touch sensor, the sensor model identification circuit comprises a plurality of capacitor units; and the touch controller first identifies a largest value from sampled relative capacitance data and format-converts the largest value into a maximum code value according to a preset number of grades; the touch controller then format-converts remaining relative capacitance data other than the largest value into corresponding code values according to the preset number of the grates and the difference between the remaining relative capacitance data and the largest value; finally, a model of the current capacitive touch sensor is obtained according to a set of code values obtained as a parsing result by format-conversion of all the relative capacitance data and a correspondence between prestored parsing results and sensor models.

5. The system according to claim 4, wherein the sensor model identification circuit includes a plurality of capacitors with fixed capacitance.

6. The system according to claim 4, wherein the sensor model identification circuit is disposed on the capacitive touch sensor and comprises a driving line and a sensing line, and the driving line multiplexes driving electrodes of the capacitive touch sensor or the sensing line multiplexes sensing electrodes of the capacitive touch sensor.

7. The system according to claim 4, wherein the preset number of the grades is an integer less than sixteen.

8. A touch screen terminal comprising a display apparatus and a system enabling a touch controller to be adaptive to a capacitive touch sensor, wherein the system comprises a host circuit board, a touch controller, a capacitive touch sensor, and a sensor model identification circuit connected to the capacitive touch sensor, wherein the touch controller is disposed on the host circuit board, and the touch controller is configured to sample the sensor model identification circuit, parse the sampled data, and select parameters corresponding to a parsing result to perform touch detection processing to the capacitive touch sensor, wherein the touch controller first identifies a largest value from sampled relative capacitance data and format-converts the largest value into a maximum code value according to a preset number of grades; the touch controller then format-converts remaining relative capacitance data other than the largest value into corresponding code values according to the preset number of the grates and the difference between the remaining relative capacitance data and the largest value; finally, a model of the current capacitive touch sensor is obtained according to a set of code values obtained as a parsing result by format-conversion of all the relative capacitance data and a correspondence between prestored parsing results and sensor models.

9. The touch screen terminal according to claim 8, wherein the sensor model identification circuit includes a plurality of capacitors with fixed capacitance.

10. The system according to claim 8, wherein the sensor model identification circuit is disposed on the capacitive touch sensor and comprises a driving line and a sensing line, and the driving line multiplexes driving electrodes of the capacitive touch sensor or the sensing line multiplexes sensing electrodes of the capacitive touch sensor.

11. The system according to claim 8, wherein the preset number of the grades is an integer less than sixteen.

* * * * *